(12) United States Patent
Shimizu et al.

(10) Patent No.: US 10,390,181 B2
(45) Date of Patent: Aug. 20, 2019

(54) TRACKING AREA IDENTITY LIST UPDATING METHOD

(71) Applicant: NTT DOCOM, INC., Chiyoda-ku (JP)

(72) Inventors: Masayoshi Shimizu, Chiyoda-ku (JP); Atsushi Minokuchi, Chiyoda-ku (JP); Takuya Shimojou, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/061,386

(22) PCT Filed: Feb. 20, 2017

(86) PCT No.: PCT/JP2017/006168
§ 371 (c)(1),
(2) Date: Jun. 12, 2018

(87) PCT Pub. No.: WO2017/169281
PCT Pub. Date: Oct. 5, 2017

(65) Prior Publication Data
US 2018/0367953 A1    Dec. 20, 2018

(30) Foreign Application Priority Data

Mar. 29, 2016 (JP) ................................. 2016-065813

(51) Int. Cl.
*H04W 4/029* (2018.01)
*H04W 8/02* (2009.01)
(Continued)

(52) U.S. Cl.
CPC ............. *H04W 4/029* (2018.02); *H04W 8/02* (2013.01); *H04W 8/12* (2013.01); *H04W 60/00* (2013.01); *H04W 88/16* (2013.01)

(58) Field of Classification Search
CPC ..... H04W 4/029; H04W 36/18; H04W 60/00; H04W 68/02; H04W 72/0406; H04W 8/08; H04W 8/02; H04W 8/082; H04W 88/16

See application file for complete search history.

(56) References Cited

U.S. PATENT DOCUMENTS

| | | | |
|---|---|---|---|
| 2011/0122845 A1* | 5/2011 | Meirosu | H04W 36/0055 370/332 |
| 2014/0078890 A1* | 3/2014 | Lu | H04W 24/04 370/221 |
| 2016/0128020 A1* | 5/2016 | Agarwal | H04W 68/04 370/328 |

FOREIGN PATENT DOCUMENTS

WO    WO 2017/125179 A1    7/2017

OTHER PUBLICATIONS

"3GPP TS 23.401, 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP TS 23.401 V13.6.0, Mar. 2016, pp. 1-365.

(Continued)

*Primary Examiner* — Quoc Thai N Vu
(74) *Attorney, Agent, or Firm* — Oblon, McClelland, Maier & Neustadt, L.L.P.

(57) ABSTRACT

A terminal connected to a plurality of user planes retains information on a tracking area where service areas of the plurality of user planes overlap each other as a tracking area identity list. When the terminal moves to the outside of a tracking area described in the tracking area identity list (a tracking area where a plurality of service areas overlap each other), the terminal transmits information on a tracking area after movement and an update request of the tracking area identity list to an MME. The MME creates, as a new tracking (Continued)

area identity list based on the update request, information on a tracking area where service areas in a plurality of user planes overlap in which a tracking area after movement is considered as a service area, and notifies the terminal of the new tracking area identity list for updating a current tracking area identity list.

8 Claims, 13 Drawing Sheets

(51) Int. Cl.
*H04W 8/12* (2009.01)
*H04W 88/16* (2009.01)
*H04W 60/00* (2009.01)

(56) References Cited

OTHER PUBLICATIONS

International Search Report dated May 16, 2017 in PCT/JP2017/006168 filed Feb. 20, 2017.
International Preliminary Report on Patentability and Written Opinion issued Oct. 11, 2018 in PCT/JP2017/006168 (with English translation), 7 pages.
Extended European Search Report dated Dec. 19, 2018 in European Patent Application No. 17773829.1, 13 pages.

\* cited by examiner (a)

SGW-U INFORMATION RETAINED BY MME

| SGW-U | SGW-C | Service Type | Service Area |
|---|---|---|---|
| 1 | 1 | a | TA1,TA2,TA3,TA4 |
| 2 | 1 | b | TA4,TA5,TA6,TA7 |
| 3 | 1 | a | TA5,TA6,TA7,TA8,TA9 |

(b)

TAI LIST RETAINED BY UE
BEFORE UPDATE

| TA4 |
|---|

AFTER UPDATE

| TA5, TA6, TA7 |
|---|

TRACKING AREA IDENTITY LIST UPDATING METHOD

TECHNICAL FIELD

The present invention relates to a tracking area identity list updating method.

BACKGROUND ART

In the related art, Non-Patent Literature 1 discloses communication processing in which a mobility management entity (MME) is selected on the basis of a terminal type of a terminal (user equipment (UE)) that requests attach processing, and the selected MME selects a serving gateway (SGW) on the basis of load information on the SGW. In addition, technology in which an MME selects an SGW corresponding to a control plane (hereinafter, simply referred to as "control plane") that is a route through which a control signal for a communication service used in a terminal is transmitted, and an SGW corresponding to a user plane (hereinafter, simply referred to as "user plane") that is a route through which a user signal for the communication service is transmitted during selection of the SGW, and technology of constructing a network environment in which an MME selects user planes for a plurality of communication services which are used by the terminal, and the terminal is connected to the plurality of user planes have been examined.

On the other hand, in a Long Term Evolution/Evolved Packet Core (LTE/EPC), a location of a terminal is managed by a tracking area (TA) identity list including identification information on the tracking area (hereinafter referred to as "tracking area identity list (TAI list)"), and when the terminal moves to the outside of the TA described in the TAI list retained by the terminal, the terminal requests an update (a tracking area update (TAU)) to a new TAI list corresponding to a terminal location after movement.

CITATION LIST

Patent Literature

[Non-Patent Literature 1] 3GPP TS 23.401

SUMMARY OF INVENTION

Technical Problem

However, in the terminal location management using the TAI list of the related art, a configuration in which a terminal is connected to a plurality of user planes has not been considered so much. Therefore, it is difficult to understand movement of the terminal to the outside of a service area of one user plane among the plurality of user planes to which the terminal is connected. In addition, it is necessary to originally perform switching of the user plane, but it is difficult to understand switching timing.

In addition, even when a terminal that has already been connected to one user plane by attach processing is connected to a new user plane (that is, when a public data network (PDN) connection is added), and the like, it is also required to appropriately perform the terminal location management using the TAI list by appropriately updating the TAI list.

The invention has been made to overcome this problem, and an object thereof is to appropriately perform terminal location management using a TAI list in a network environment in which a control plane and a user plane are each selected as an SGW, and a terminal is capable of being connected to a plurality of user planes.

Solution to Problem

According to a first aspect of the invention, there is provided a tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to one or more user planes and retains information on tracking areas corresponding to service areas of the user planes as a tracking area identity list. When the terminal is connected to the plurality of user planes, the terminal retains information on tracking areas where service areas of the plurality of user planes overlap, as the tracking area identity list. The tracking area identity list updating method includes: a step of transmitting information on a tracking area after movement and an update request of the tracking area identity list to the processing server, by the terminal, when the terminal moves to the outside of tracking areas described in the tracking area identity list, and a step of creating, as a new tracking area identity list, information on tracking areas where service areas in the plurality of user planes overlap in which the tracking area after movement is considered as a service area, and notifying the terminal of the new tracking area identity list for updating a current tracking area identity list, by the processing server, on the basis of the update request.

In the tracking area identity list updating method according to the first aspect, when the terminal is connected to the plurality of user planes, the terminal retains information on tracking areas where service areas of the plurality of user planes overlap, as the tracking area identity list. When the terminal moves to the outside of the tracking areas described in the tracking area identity list, the terminal transmits information on a tracking area after movement and an update request of the tracking area identity list to the processing server. The processing server creates, as a new tracking area identity list, information on tracking areas where service areas in the plurality of user planes overlap in which the tracking area after movement is considered as a service area, and notifies the terminal of the new tracking area identity list for updating a current tracking area identity list, on the basis of the update request. According to this, even when the terminal moves to the outside of tracking areas (tracking areas where service areas in the plurality of user planes overlap) described in the tracking area identity list, it is possible to appropriately perform terminal location management using the TAI list by appropriately updating the TAI list.

According to a second aspect of the invention, there is provided a tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to one or more user planes and retains information on tracking areas corresponding to service areas of the user planes as a tracking area identity list The tracking area identity list updating method includes: a step of transmitting an update request of the tracking area identity list to the processing server, by the terminal connected to the one or more user planes, when the terminal is connected to a new user plane or cuts off a connection with the user planes to which the terminal is connected; and a step of creating, as a new tracking area identity list, information on tracking areas where service areas in the plurality of user planes after updating based on the update request overlap, and notifying the terminal of the new tracking area identity list for updating a current tracking area identity list, by the processing server.

In the tracking area identity list updating method according to the second aspect, the terminal retains information on tracking areas corresponding to service areas of one or more user planes to which the terminal is connected, as a tracking area identity list. When the terminal is connected to a new user plane, or cuts off a connection with the user planes to which the terminal is connected, the terminal transmits an update request of the tracking area identity list to the processing server. The processing server creates, as a new tracking area identity list, information on tracking areas where service areas in the plurality of user planes after updating based on the update request overlap, and notifies the terminal of the new tracking area identity list for updating a current tracking area identity list. According to this, even when the terminal is connected to a new user plane or cuts off a connection with the user planes to which the terminal is connected, it is possible to appropriately perform terminal location management using the TAI list by appropriately updating the TAI list.

According to a third aspect of the invention, there is provided a tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to one or more user planes and retains information on tracking areas corresponding to service areas of the user planes as a tracking area identity list. When the terminal is connected to the plurality of user planes, the terminal retains information on tracking areas which constitute a service area of each of the plurality of user planes, as a tracking area identity list for every user plane. The tracking area identity list updating method includes: a step of transmitting information on a tracking area after movement and an update request of the tracking area identity list to the processing server, by the terminal, when the terminal moves to the outside of a tracking area group described in any tracking area identity list among the tracking area identity lists for every user plane; and a step of creating information relating to the tracking area identity list corresponding to the plurality of user planes in which the tracking area after movement is considered as a service area, and notifying the terminal of the created information to update the tracking area identity list for every user plane, by the processing server, on the basis of the update request.

In the tracking area identity list updating method according to the third aspect, when the terminal is connected to the plurality of user planes, the terminal retains information on tracking areas which constitute a service area of each of the plurality of user planes, as a tracking area identity list for every user plane. When the terminal moves to the outside of a tracking area group described in any tracking area identity list among the tracking area identity lists for every user plane, the terminal transmits information on a tracking area after movement and an update request of the tracking area identity list to the processing server. The processing server creates information relating to the tracking area identity list corresponding to the plurality of user planes in which the tracking area after movement is considered as a service area, and notifies the terminal of the created information to update the tracking area identity list for every user plane, on the basis of the update request. According to this, even when the terminal moves to the outside of a tracking area group described in any tracking area identity list among tracking area identity lists for every user plane, it is possible to appropriately perform terminal location management using the TAI list by appropriately updating the TAI list.

Furthermore, in the step of creating, the processing server may create, as the information relating to the tracking area identity list, information on tracking areas which constitute a service area of a user plane added along with movement among the plurality of user planes.

In addition, in the step of creating, the processing server may create, as the information relating to the tracking area identity list, information on tracking areas which constitute a service area of each of the plurality of user planes.

According to a fourth aspect of the invention, there is provided a tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to one or more user planes and retains information on tracking areas corresponding to service areas of the user planes as a tracking area identity list. The tracking area identity list updating method includes: a step of transmitting an update request of the tracking area identity list to the processing server, by the terminal connected to the one or more user planes, when the terminal is connected to a new user plane or when the terminal cuts off a connection with the user planes to which the terminal is connected; and a step of creating information relating to a tracking area identity list corresponding to the plurality of user planes after updating based on the update request, and notifying the terminal of the created information to update the tracking area identity list with a tracking area identity list for every user plane, by the processing server.

In the tracking area identity list updating method according to the fourth aspect, the terminal retains information on tracking areas corresponding to service areas of one or more user planes to which the terminal is connected, as a tracking area identity list. When the terminal is connected to a new user plane or cuts off a connection with the user planes to which the terminal is connected, the terminal transmits an update request of the tracking area identity list to the processing server. The processing server creates information relating to a tracking area identity list corresponding to the plurality of user planes after updating based on the update request, and notifying the terminal of the created information to update the tracking area identity list with a tracking area identity list for every user plane. According to this, even when the terminal is connected to a new user plane or cuts off a connection with the user planes to which the terminal is connected, it is possible to appropriately perform terminal location management using the TAI list by appropriately updating the TAI list.

Furthermore, in the step of creating, the processing server may create, as information relating to the tracking area identity list, information on tracking areas which constitute a service area of an added new user plane.

In addition, in the step of creating, the processing server may create, as information relating to the tracking area identity list, information on tracking areas which constitute a service area of each of the plurality of user planes after update.

Advantageous Effects of Invention

According to the invention, it is possible to appropriately perform terminal location management using a TAI list in a network environment where a control plane and a user plane are each selected as an SGW, and a terminal is capable of being connected to a plurality of user planes.

DESCRIPTION OF EMBODIMENTS

Figure 1:
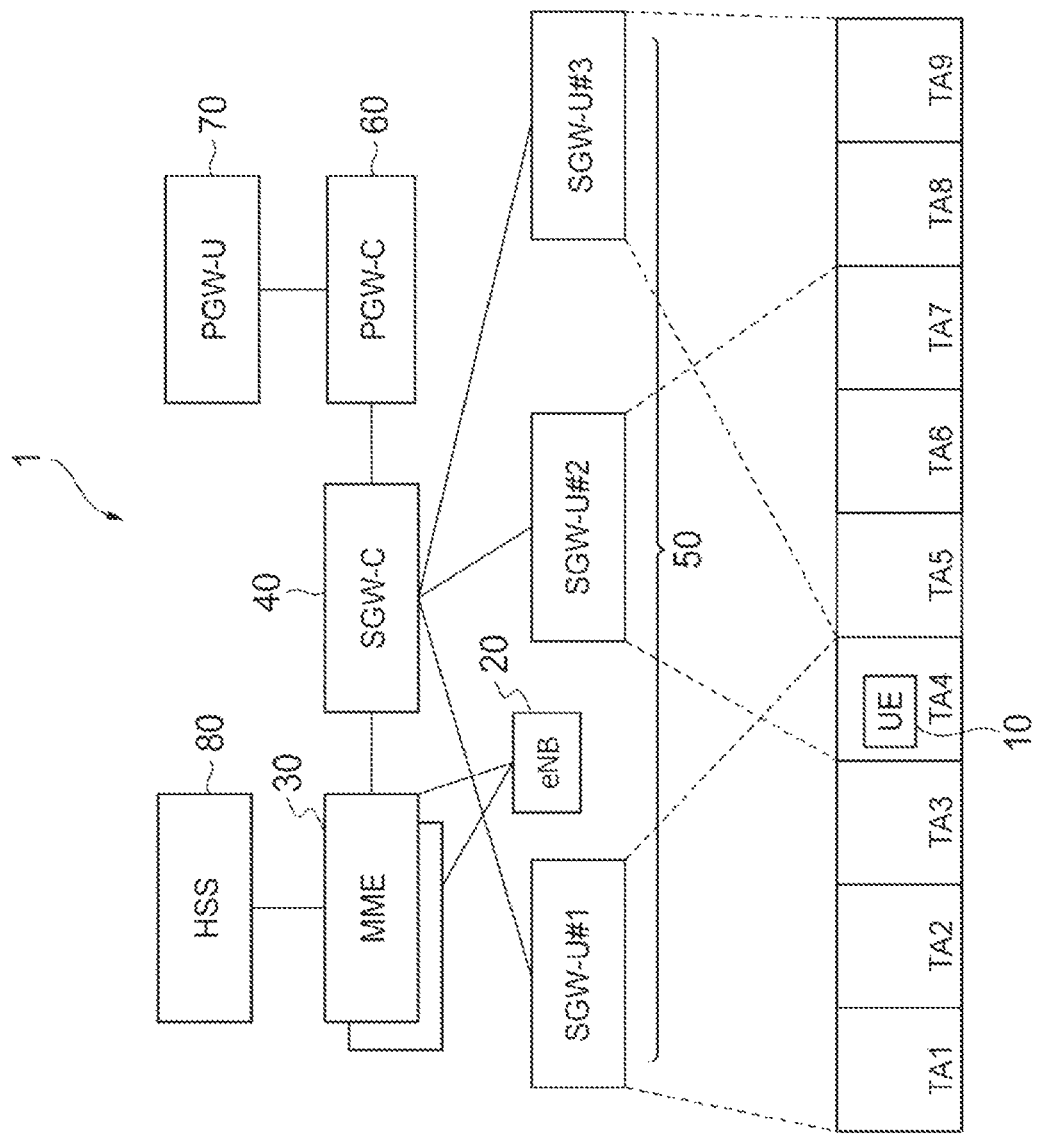
FIG. 1 is a view illustrating a configuration example of a system according to first and second embodiments.

Hereinafter, various embodiments of a tracking area identity list updating method according to the invention will be described in detail with reference to the accompanying drawings. Hereinafter, various kinds of processing when a terminal retains information on tracking areas in which service areas of a plurality of user planes overlap as a tracking area identity list as a first embodiment, and processing when a terminal retains information on tracking areas which constitute a service area of each of the plurality of user planes as the tracking area identity list as a second embodiment will be described.

TAU processing (FIG. 7) in the first embodiment corresponds to an example of the tracking area identity list updating method according to the first aspect described in [Solution to Problems], and processing (FIG. 6) when a PDN connection is added and processing (FIG. 8) when the PDN connection is cut off in the first embodiment correspond to an example of the tracking area identity list updating method according to the second aspect described in [Solution to Problems].

In addition, TAU processing (FIG. 12) in the second embodiment corresponds to an example of the tracking area identity list updating method according to the third aspect described in [Solution to Problems], and processing (FIG. 11) when a PDN connection is added and processing (FIG. 13) when the PDN connection is cut off in the second embodiment correspond to an example of the tracking area identity list updating method according to the fourth aspect described in [Solution to Problems]. In addition, the same reference numerals will be given to the same elements in description of drawings, and redundant description thereof will be omitted. [0025] [First embodiment](Description of system configuration example) As illustrated in FIG. 1, a communication system 1 according to embodiments of the invention includes: a terminal (user equipment (hereinafter referred to as "UE")) 10; an eNodeB (hereinafter referred to as "eNB") 20 corresponding to a base station in an LTE network; a plurality of MMEs 30 which perform processing such as location management, authentication control, and communication route setting of the UE 10 that is resident in the LTE network; a home subscriber server (HSS) 80 that manages subscriber information including contract information, authentication information, communication service information, terminal type information, and residence information on a communication terminal such as the UE 10 as a database; serving gateways (SGWs) 40 and 50 to be described later; and packet data network gateways (PGWs) 60 and 70 to be described later.

Each of the PGWs is a gateway that is a junction point with a packet data network (PDN), and performs allocation of an IP address and packet transmission to the SGWs, and the like. The PGWs of this embodiment are classified into a PGW-U 70 relating to transmission of a user signal for a communication service, and a PGW-C 60 relating to transmission of a control signal.

The SGWs are gateways which function as resident packet exchangers that accommodate LTE, and are classified into an SGW-U 50 relating to transmission of a user signal (corresponding to the above-described user plane), and an SGW-C 40 relating to transmission of a control signal (corresponding to the above-described control plane). A plurality of SGW-Us 50 are provided in correspondence with requirements of a plurality of communication services which are used by the UE 10. Hereinafter, the plurality of SGW-Us 50 are referred to as "SGW-U#1," "SGW-U#2," and "SGW-U#3" for discrimination.

As illustrated in FIG. 1, the SGW-U#1, SGW-U#2, and SGW-U#3 are provided under the SGW-C 40. Tracking areas (hereinafter, referred to as "TA") 1 to TA4 are set as service areas in the SGW-U#1, the TA4 to a TA7 are set as service areas in the SGW-U#2, and a TA5 to a TA9 are set as service areas in the SGW-U#3.

Figure 2:
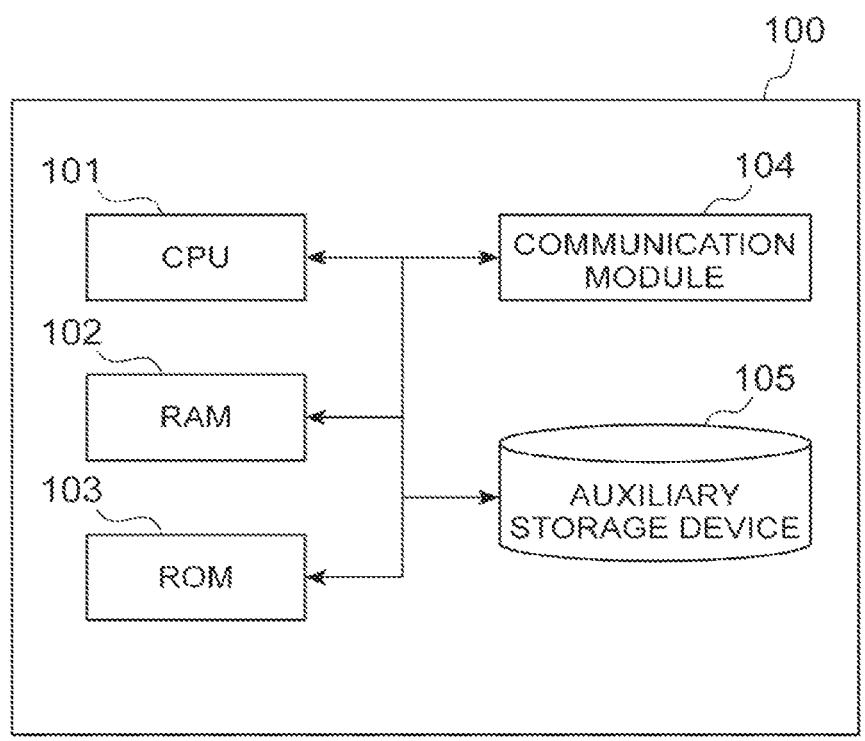
FIG. 2 is a view illustrating a hardware configuration example of each device.

Each device (collectively referred to as a device 100) in FIG. 1 is constituted by a typical computer with a communication function. For example, as illustrated in FIG. 2, the device 100 is constituted by one or a plurality of computers including one or a plurality of CPUs 101, a random access memory (RAM) 102 and a read only memory (ROM) 103 which are main storage devices, a communication module 104 (a transmitter or a receiver) configured to perform communication, and hardware such as an auxiliary storage device 105 (memory) including a hard disk. In each device 100, the communication module 104 and the like are operated under control of the CPU 101 by reading predetermined computer software on hardware such as the CPU 101 and the RAM 102 illustrated in FIG. 2, and a series of functions in respective units are realized by reading out and recording data in the RAM 102 and the auxiliary storage device 105.

Furthermore, all or some functions of a processor such as the CPU 101 may be executed by a dedicated integrated circuit (IC). For example, the functions may be executed by constructing a dedicated integrated circuit for performing image processing or communication control.

Regardless of whether the software is called software, firmware, middleware, microcode, hardware description language, or another names, the software should be widely interpreted to mean a command, a command set, a code, a code segment, a program code, a program, a subprogram, a software module, an application, a software application, a software package, a routine, a subroutine, an object, an executable file, an execution thread, a procedure, a function, and the like.

In addition, the software, the command, and the like may be transmitted and received through a transmission medium. For example, when the software is transmitted from a website, a server, or another remote source using a wire technology such as a coaxial cable, an optical fiber cable, a twist pair, and a digital subscriber line (DSL) and/or a wireless technology such as infrared rays, radio, and microwaves, the wire technology and/or the wireless technology are included in definition of the transmission medium.
[0033] (Overview of processing in first embodiment) Here, an overview of processing in which the UE 10 retains information on TAs in which service areas of the plurality of SGW-Us overlap as a tracking area identity list (TAI list) in the first embodiment will be described with reference to FIG. 3 and FIG. 4.

The MIME 30 retains SGW-U information illustrated in FIG. 4(a), that is, information on a correlated SGW-C, information on a correlated service type, and information on a service area of a service target with respect to each of the SGW-U#1 to the SGW-U#3. When the UE 10 is currently resident in the TA4 illustrated in FIG. 3, and receives services of a service type "a" and a service type "b," the UE 10 retains a TA corresponding to an area in which a service area of the SGW-U#1 and a service area of the SGW-U#2 overlap (here, "TA4") as the TAI list (before update in FIG. 4(b)).

Figure 3:
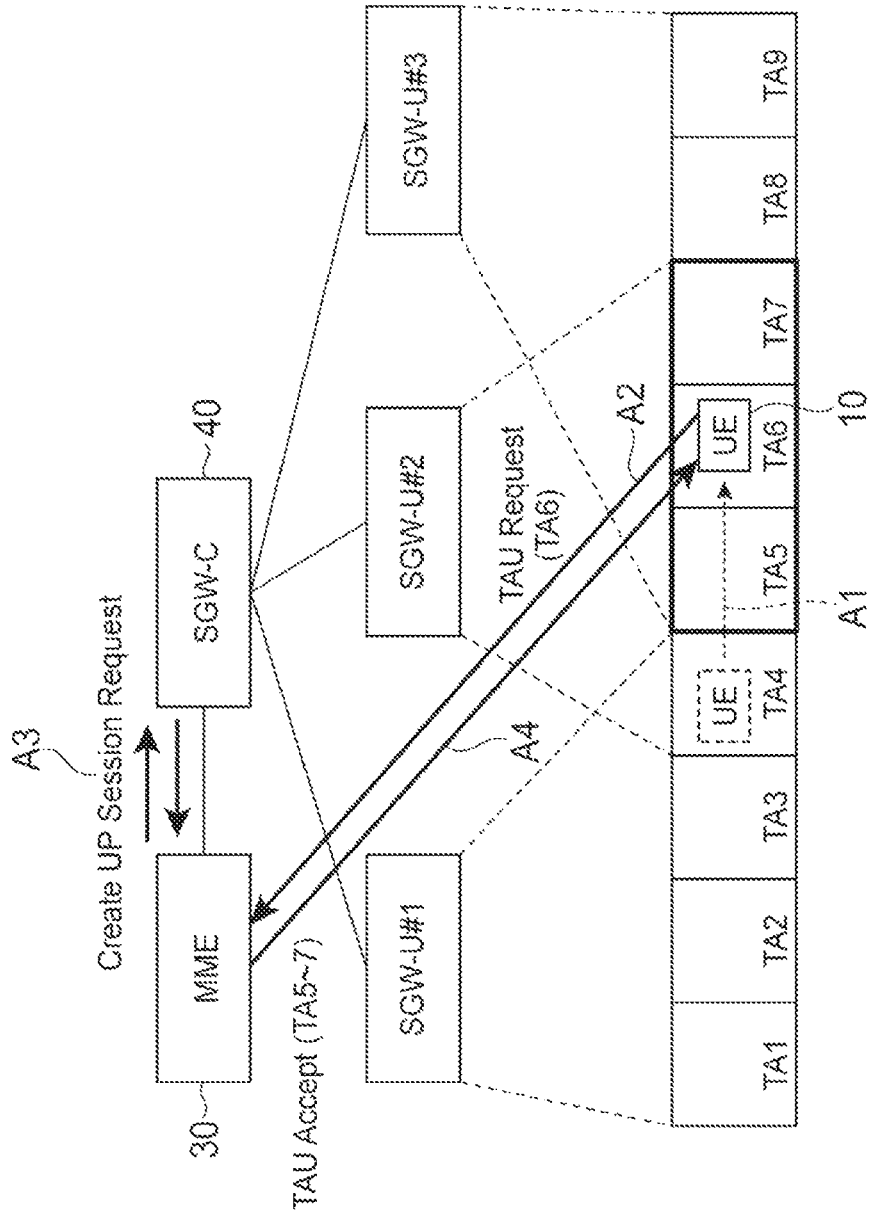
FIG. 3 is a view illustrating an overview of processing according to the first embodiment.
Figure 4:
FIG. 4 (a) is a view illustrating an example of SGW-U information that is retained by an MME, and FIG. 4 (b) is a view illustrating an example of a TAI list before update and after update according to the first embodiment.

Here, for example, as illustrated in FIG. 3, when the UE 10 moves from "TA4" that is retained as the TAI list to another area (for example, moves from TA4 to TA6) (an arrow A1 in FIG. 3), the UE 10 makes a request for the MME 30 to perform TAI list update processing (tracking area update (hereinafter referred to as "TAU")) (an arrow A2 in FIG. 3).

The MME 30 determines that the UE 10 has moved to another area from the service area of the SGW-U#1 on the basis of a location (TA6) after movement of the UE 10 with reference to the SGW-U information in FIG. 4(a), and makes a request for the SGW-C 40 to change the SGW-U (an arrow A3 in FIG. 3).

The TA6 that is a TA after movement of the UE 10 is in a service area of both of the SGW-U#2 relating to a service of the service type "b," and the SGW-U#3 relating to a service of the service type "a," and thus the MME 30 creates TAs corresponding to an area in which the service area of the SGW-U#2 and the service area of the SGW-U#3 overlap (here, "TA5 to TA7") as a new TAI list, notifies the UE 10 of the new TAI list, and updates the TAI list as in "after update" in FIG. 4(b) (an arrow A4 in FIG. 3).

Various Kinds of Processing in First Embodiment

Figure 5:
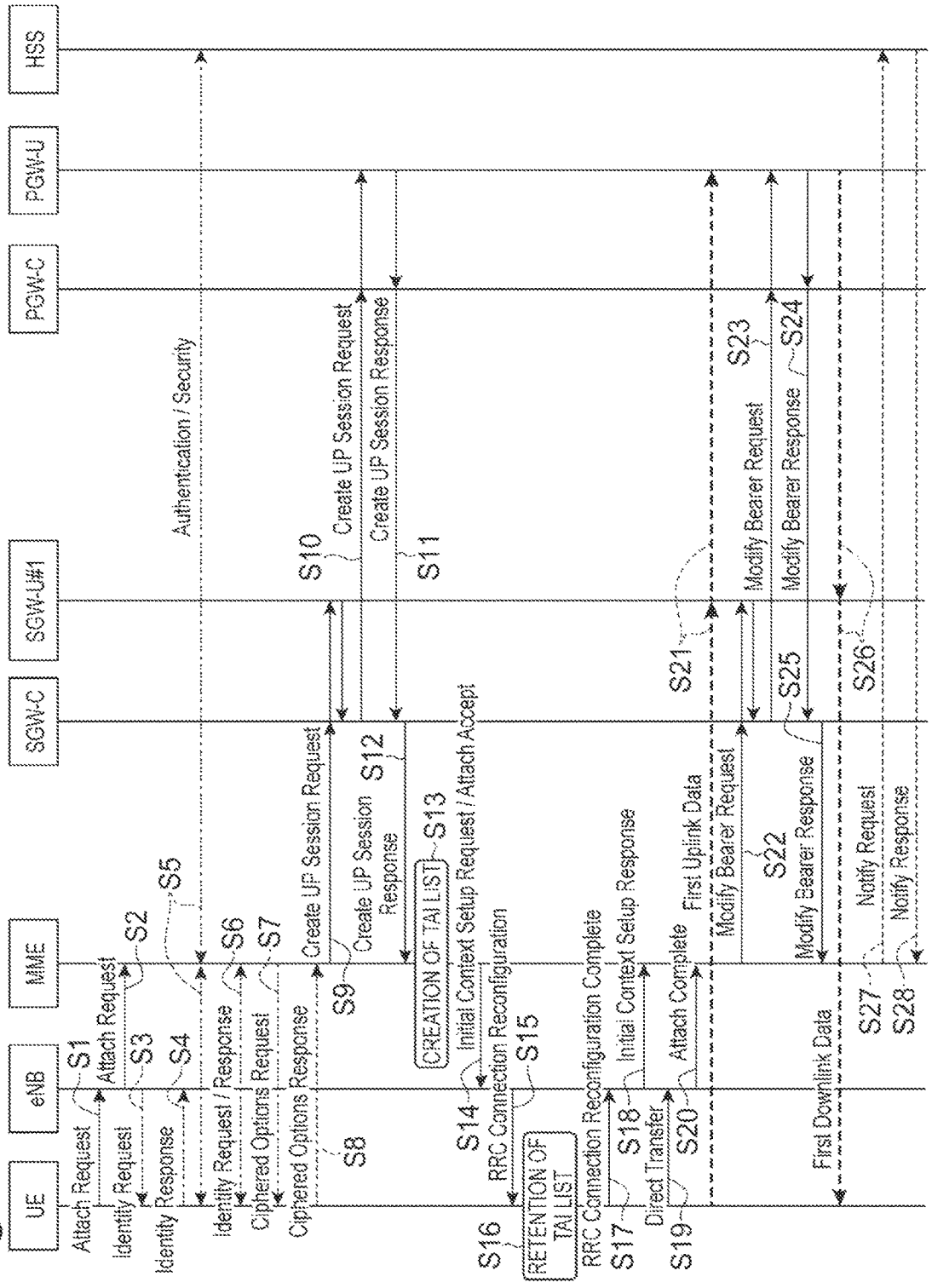
FIG. 5 is a flowchart illustrating an example of attach processing according to the first and second embodiments.

Hereinafter, attach processing (FIG. 5), processing when a PDN connection is added (FIG. 6), TAU processing (FIG. 7), and processing when the PDN connection is cut off (FIG. 8) will be described in that order as processing in the first embodiment.

(Attach Processing (FIG. 5))

When the UE issues an Attach Request after the power of the UE is turned on as a trigger (step S1), the Attach Request is transmitted to the MME through the eNB (step S2). Then, when the eNB transmits an Identity Request to the UE to obtain ID information on the UE (step S3), the UE responds with an Identity Response to the eNB (step S4).

The MME, which receives the Attach Request, performs predetermined authentication processing with respect to each of the HSS and the UE (step S5). In addition, exchange of the Identity Request/the Identity Response is performed between the MME and the UE (step S6). When the MME transmits a Ciphered Options Request to the UE to set options relating to a cipher and the like (step S7), the UE responds with a Ciphered Options Response to the MME (step S8).

It is assumed that the UE is resident in the TA4, and requests a service offer of a service type "a." At this time, the MME selects the SGW-U#1 as an SGW-U which includes the TA4 as a service area and of which a service type is the service type "a" with reference to the SGW-U information in FIG. 4(a), and transmits the Create UP Session Request to the SGW-U#1 through the SGW-C (step S9). After receiving a normal response from the SGW-U#1, the SGW-C transmits a Create UP Session Request to the PGW-U through the PGW-C (step S10). After receiving a normal response from the PGW-U, when the PGW-C responds a Create UP Session Response indicating that a session is constructed normally between the PGW-U, the SGW-U#1, and the UE to the SGW-C (step S11), the SGW-C transmits the same response to the MME (step S12)

In addition, the MIME creates a TAI list in which TAs corresponding to a service area of the SGW-U (here, "SGW-U#1") to which the UE is connected for the first time (here, "TA1 to TA4") are listed (step S13). In addition, when the MME transmits an Initial Context Setup Request and Attach Accept to the eNB (step S14), the eNB transmits RRC Connection Reconfiguration to the UE (step S15).

In the processing in steps S14 and S15, the TAI list created in step S13 is transmitted from the MME to the UE through the eNB, and is retained by the UE (step S16).

Then, as in attach processing in the related art, when the UE responds with an RRC Connection Reconfiguration Complete to the eNB (step S17), the eNB responds with an Initial Context Setup Response to the MME (step S18). In addition, when the UE transmits Direct Transfer including Attach Complete to the eNB (step S19), the eNB transmits the Attach Complete to the MME (step S20).

In addition, when first user data in an uplink direction after the Attach Complete is transmitted from the UE to the PGW-U through the SGW-U#1 (step S21), the MME transmits a Modify Bearer Request to the SGW-U#1 through the SGW-C to correct bearer (user data packet route) information (step S22). After receiving a normal response from the SGW-U#1, the SGW-C transmits the Modify Bearer Request to the PGW-U through the PGW-C (step S23). After receiving a normal response from the PGW-U, when the PGW-C responds with a Modify Bearer Response indicating that a bearer is corrected normally to the SGW-C (step S24), the SGW-C responds with the Modify Bearer Response to the MME (step S25).

In addition, when first user data in a downlink direction after the Attach Complete is transmitted from the PGW-U to the UE through the SGW-U#1 (step S26), the MME exchanges the Notify Request and the Notify Response with the HSS to update UE residence information (steps S27 and S28).

Through the above-described attach processing, a PDN connection between the UE and the PGW-U is set normally through the SGW-U#1, and during the same processing, the TAI list, in which TAs corresponding to a service area of the SGW-U (here, SGW-U#1) to which the UE is connected for the first time (here, TAI to TA4) are listed, is created, and the TAI list is transmitted to the UE and retained by the UE.

(Processing when PDN Connection is Added (FIG. 6))

When the UE issues a UE Connectivity Request to the MME to request addition of the PDN connection (step S31), the MIME selects an SGW-U that satisfies conditions of a PDN connection addition request as follows (step S32). Here, it is assumed that the UE is resident in the TA4, and requests a service offer of the service type "b." At this time, the MME selects the SGW-U#2 as an SGW-U which includes the TA4 as a service area and of which a service type is the service type "b" with reference to the SGW-U information in FIG. 4(a), and transmits the Create UP Session Request to the SGW-U#2 through the SGW-C (step S33). After receiving a normal response from the SGW-U#2, the SGW-C transmits the Create UP Session Request to the PGW-U through the PGW-C (step S34). After receiving a normal response from the PGW-U, when the PGW-C responds with a Create UP Session Response indicating that the PDN connection is added normally to the SGW-C (step S35), the SGW-C responds with the Create UP Session Response indicating that the PDN connection between the PGW-U, the SGW-U#2, and the UE is added normally to the MME (step S36).

In addition, the MME creates a TAI list in which a TA corresponding to an area in which a service area of the SGW-U#1 relating to an existing PDN connection and a service area of the SGW-U#2 relating to the added PDN connection overlap (here, "TA4") is listed (step S37).

In addition, when the MME transmits a Bearer Setup Request and PDN Connectivity Accept including the TAI list to the eNB (step S38), the eNB transmits RRC Connection Reconfiguration and the PDN Connectivity Accept including the TAI list to the UE (step S39). Here, the UE updates the TAI list that is retained with the received TAI list (step S40).

Then, as in processing in the related art, when the UE responds with an RRC Connection Reconfiguration Complete to the eNB (step S41), the eNB responds with a Bearer Setup Response to the MME (step S42). In addition, when the UE transmits a Direct Transfer including the PDN Connectivity Complete to the eNB (step S43), the eNB transmits the PDN Connectivity Complete to the MME (step S44).

In addition, when first user data in an uplink direction after addition of the PDN connection is transmitted from the UE to the PGW-U through the SGW-U#2 (step S45), the MME transmits a Modify Bearer Request to the SGW-U#2 through the SGW-C to correct bearer (user data packet route) information (step S46). After receiving a normal response from the SGW-U#2, the SGW-C transmits the Modify Bearer Request to the PGW-U through the PGW-C (step S47).

After receiving a normal response from the PGW-U, when the PGW-C responds with a Modify Bearer Response indicating that a bearer is normally corrected to the SGW-C (step S48), the SGW-C transmits the Modify Bearer Response to the MME (step S49).

In addition, when first user data in a downlink direction after addition of the PDN connection is transmitted from the PGW-U to the UE through the SGW-U#2 (step S50), the MME exchanges the Notify Request and the Notify Response with the HSS to update UE residence information (steps S51 and S52).

Through the above-described processing when the PDN connection is added, the PDN connection between the UE and the PGW-U is additionally set normally through the SGW-U#2, and during the same processing, the UE can perform updating to an appropriate TAI list corresponding to a situation after addition of the PDN connection, and can appropriately perform UE location management using the TAI list.

(TAU Processing (FIG. 7))

For example, as illustrated in FIG. 3, when the UE moves from the "TA4" retained as the TAI list to another area (for example, from the TA4 to the TA6), if the UE issues a TAU Request to the eNB (step S61), the eNB detects that the UE after movement is resident in the TA6, and transmits the TAU Request to a new MME (in FIG. 7, described as "new MME." Hereinafter, referred to as "new MME") that controls the TA6 (step S62).

When receiving the TAU Request, the new MME acquires information on the TA (TA4) before movement of the UE from the LTE network, and determines an SGW-U (In FIG. 7, described as "old SGW-U." Hereinafter, referred to as "old SGW-U." Here, specifically, SGW-U#1) that becomes a service area of which a service is not offered to the UE due to movement of the UE with reference to the SGW-U information in FIG. 4(a) (step S63). In addition, the new MME specifies an MME (in FIG. 7, described as "old MME." Hereinafter, referred to as "old MME") that controls the TA (TA4) before movement of the UE, and makes a request for UE information to the old MME (step S64). According to this, the old MME responds with the UE information to the new MME (step S65). In addition, the new MME that receives the UE information performs predetermined authentication processing with respect to each of the HSS and the UE (step S66). In addition, the new MME transmits a reception response of the UE information including ID information on the old SGW-U obtained by the determination in step S63 to the old MME (step S67). According to this, the old MME can acquire ID information on the old SGW-U (SGW-U#1), and can make a PDN connection deletion request to the old SGW-U to be described later.

In addition, the new MIME selects an SGW-U which is to take over the service of the old SGW-U (SGW-U#1) (step S68). At this time, the MME selects SGW-U#3 as an SGW-U that includes the TA6 after movement as a service area and has the same service type "a" as that of the old SGW-U with reference to the SGW-U information in FIG. 4(a). In addition, the new MME transmits a Create UP Session Request to the SGW-U#3 through the SGW-C (steps S69 and S70). In addition, when transmitting a Modify Bearer Request to the PGW-U through the PGW-C to correct bearer (user data packet route) information (step S71), the SGW-U#3 receives a Modify Bearer Response as a response thereof from the PGW-U through the PGW-C (step S72), and responds with a Create UP Session Response to the new MME through the SGW-C (steps S73 and S74).

In addition, when the new MME makes a request for the HSS to update the TA4 into the TA6 with respect to residence information on the UE to update the residence information on the UE in the HSS (step S75), the HSS notifies the old MME of an instruction of deleting the residence information (TA4) of the UE before movement (step S76). In addition, when an acknowledgement is transmitted from the old MME to the HSS (step S77), the HSS performs residence information updating corresponding to the request in step S75, and transmits the acknowledgement to the new MME (step S78). In addition, when the old MME transmits a Delete UP Session Request including ID information on the old SGW-U (SGW-U#1) which is given in notification in step S67 to the SGW-C (step S79), the SGW-C specifies the old SGW-U (SGW-U#1) from the received ID information on the old SGW-U, and transmits the Delete UP Session Request to the old SGW-U (SGW-U#1) to cut off the PDN connection before movement (step S80). When the PDN connection before movement is normally cut off, a Delete UP Session Response is responded to the old MME from the old SGW-U (SGW-U#1) through the SGW-C (steps S81 and S82).

On the other hand, after receiving the acknowledgement of the residence information updating from the HSS in step S78, the new MME creates a TAI list in which TAs (here, "TA5 to TA7") corresponding to an area, in which a service area of the SGW-U#2 to which the UE after movement is connected and a service area of the SGW-U#3 overlap each other, are listed up (step S83), and transmits TAU Accept including the TAI list to the UE (step S84).

In addition, the UE updates the TAI list that is retained with the TAI list included in the TAU Accept (step S85), and responds with TAU Complete to the new MME after completion of the updating (step S86).

Through the above-described TAU processing, even when the UE moves to another area from the TA that is retained as the TAI list, it is possible to appropriately update the TAI list of the UE in correspondence with a situation after movement, and it is possible to appropriately perform the UE location management using the TAI list.

Figure 7:
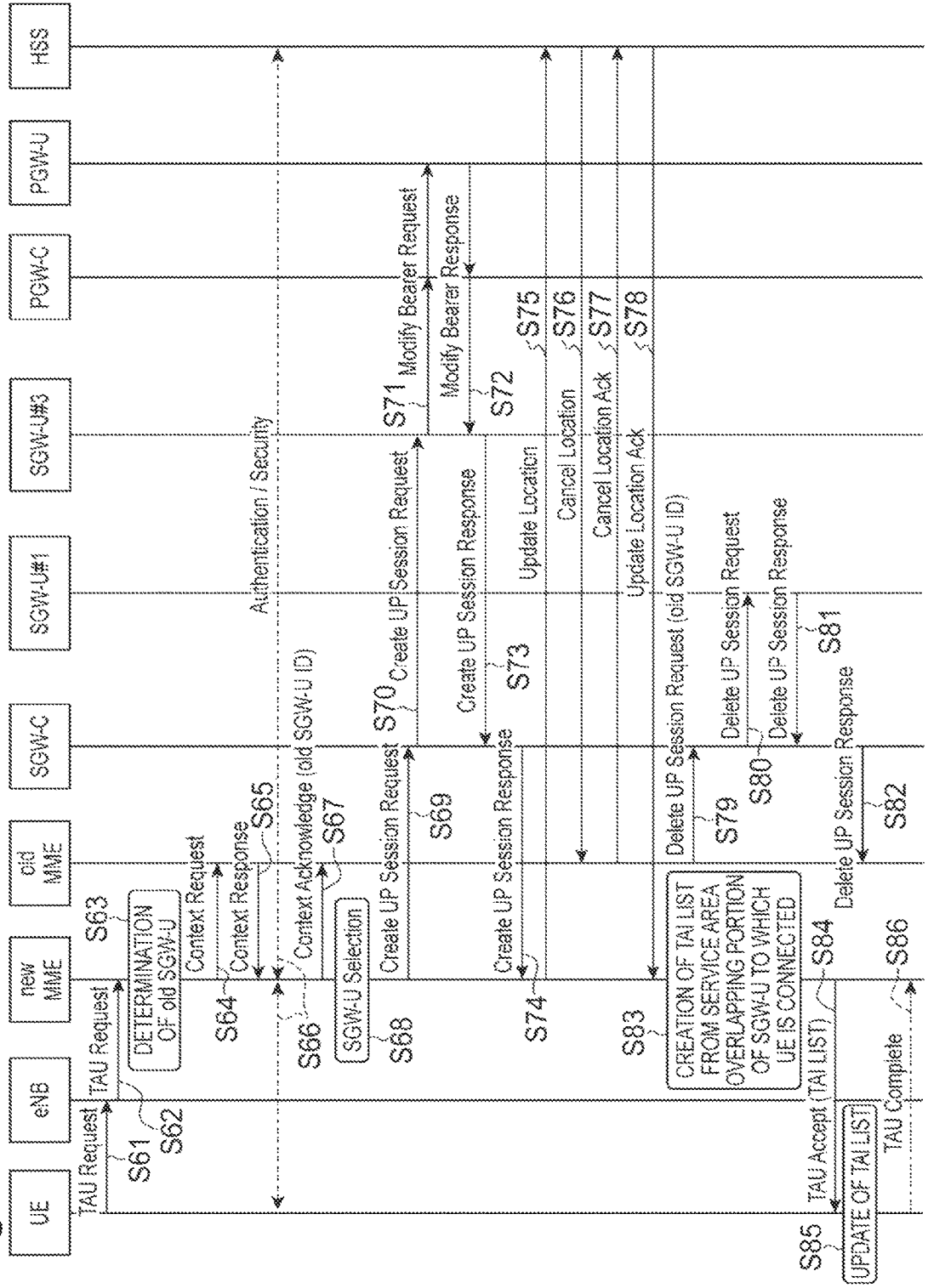
FIG. 7 is a flowchart illustrating an example of TAU processing according to the first embodiment.

Furthermore, FIG. 7 and FIG. 12 to be described later illustrate an example in which the UE moves from a control area of an old MME to a control area of a new MME, but the invention is also applicable to movement in a control area of a single MME without limitation to movement over the control areas of the MME.

(Processing when PDN connection is cut off (FIG. 8)) For example, when the MIME receives an existing PDN connection (here, for example, a PND connection between the UE and the PGW-U through the SGW-U#2) cutting-off request from the UE (step S91) or when an event in which the MME needs to cut off the existing PDN connection occurs (step S92), the MME transmits a Delete UP Session Request indicating cutting-off of the connection between the UE of the SGW-U#2 and the PGW-U to the SGW-U#2 through the SGW-C (step S93). After receiving an acknowledgement from the SGW-U#2, the SGW-C transmits the Delete UP Session Request to the PGW-U through the PGW-C (step S94). After receiving an acknowledgement from the PGW-U, when the PGW-C responds with the Delete UP Session Response indicating that the PDN connection is normally cut off to the SGW-C (step S95), the SGW-C responds with the Delete UP Session Response to the MME (step S96).

In addition, the MME creates a TAI list in which TAs corresponding to an overlapping portion of service areas of the SGW-Us to which the UE is connected after cutting-off of the PDN connection is listed up (step S97). At this time, when the UE is connected to only one SGW-U after cutting-off the PDN connection, a TAI list in which TAs corresponding to a service area of the one SGW-U are listed up is created.

Then, when the MME transmits a Deactivate EPS Bearer Context Request including the created TAI list to the eNB (step S98), the eNB transmits the Deactivate EPS Bearer Context Request including the TAI list and RRC Connection Reconfiguration to the UE (step S99).

In addition, the UE updates the TAI list that is retained with the TAI list included in the Deactivate EPS Bearer Context Request (step S100). According to this, the UE can perform updating into an appropriate TAI list corresponding to a situation after cutting-off of the PDN connection. Furthermore, after completion of updating, as in processing in the related art, when the UE responds with an RRC Connection Reconfiguration complete to the eNB (step S101), the eNB responds with a Deactivate Bearer Response to the MME (step S102).

In addition, when the UE transmits Direct Transfer to the eNB (step S103), the eNB transmits Deactivate EPS Bearer Context Accept to the MME (step S104).

Through the above-described processing when the PDN connection is cut off, the UE can perform updating into an appropriate TAI list corresponding to a situation after cutting-off of the PDN connection, and it is possible to appropriately perform the UE location management using the TAI list.

According to the above-described first embodiment, when the UE retains information on a TA corresponding to an area in which service areas of the plurality of SGW-Us overlap each other as the TAI list, even in any one of the processing when a PDN connection is added (FIG. 6), the TAU processing (FIG. 7), and the processing when the PDN connection is cut off (FIG. 8), the UE can perform updating into an appropriate TAI list corresponding to a situation at that point of time and can retain the TAI list, and it is possible to appropriately perform the UE location management using the TAI list.

Second Embodiment

Next, description will be given of processing when the UE retains information on TAs which constitute a service area of each of the plurality of SGW-Us as the TAI list according to a second embodiment. Furthermore, the system configuration described with reference to FIG. 1 and FIG. 2, and the like are the same as in the first embodiment, and thus redundant description thereof will be omitted.

Overview of Processing in Second Embodiment

First, description will be given of an overview of processing in which the UE retains information on TAs which constitute a service area of each of the plurality of user planes as the TAI list according to the second embodiment with reference to FIG. 4(a), FIG. 9 and FIG. 10.

As in the first embodiment, the MME 30 retains the SGW-U information illustrated in FIG. 4(a). When the UE 10 is currently resident in a TA4 illustrated in FIG. 9, and receives services of a service type "a" and a service type "b", the UE 10 is retaining information on the TAs which constitute each service area of the SGW-U#1 and the SGW-U#2 as the TAI list illustrated in "before update" in FIG. 10.

Figure 9:
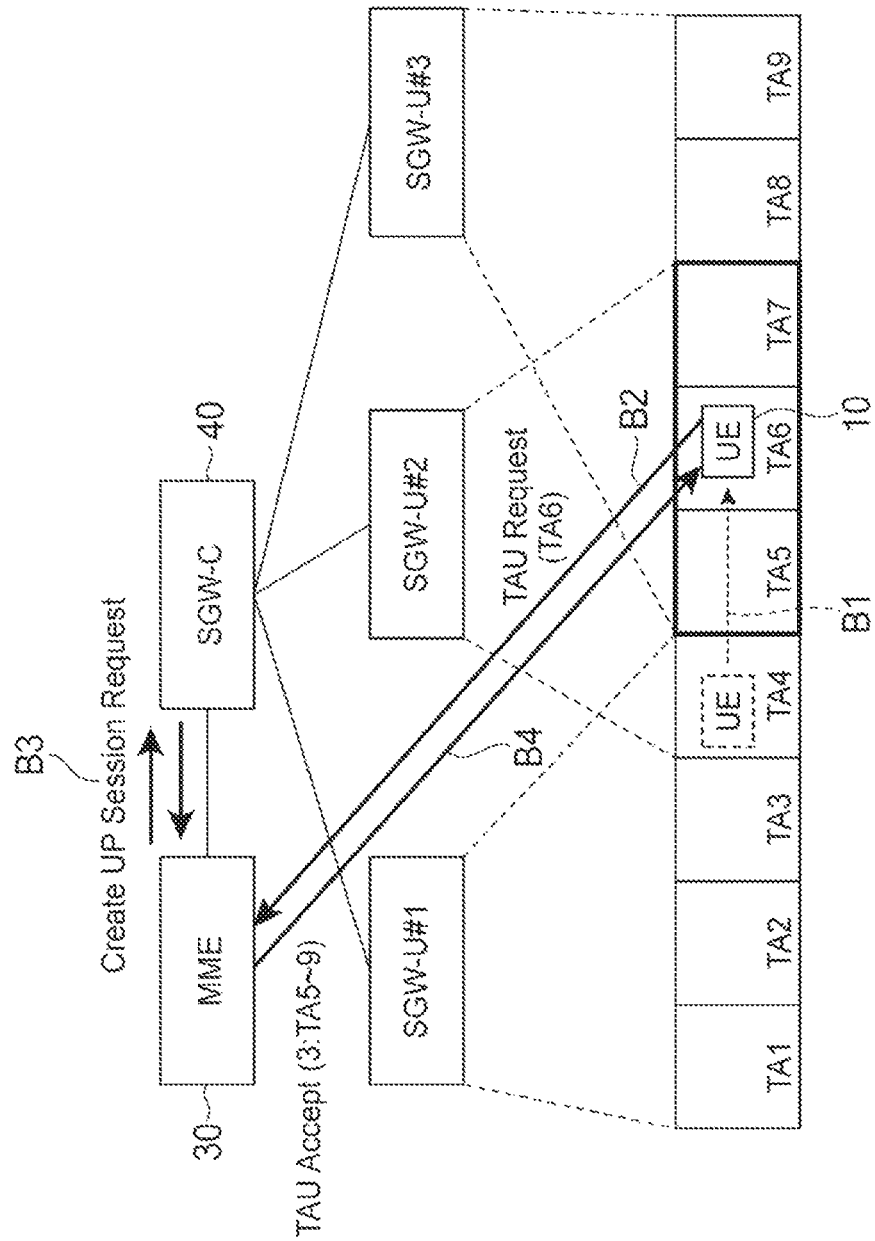
FIG. 9 is a view illustrating an overview of processing according to the second embodiment.

Here, for example, as illustrated in FIG. 9, when the UE 10 moves from the TA4 to a TA6 (an arrow B1 in FIG. 9), the UE 10 makes a request for TAI list updating (TAU) to the MME 30 (an arrow B2 in FIG. 9).

The MME 30 determines that the UE 10 has moved to another service area from the service area of the SGW-U#1 and enters a service area of the SGW-U#3 in the same service type "a" as that of the SGW-U#1 on the basis of a location (TA6) after movement of the UE 10 with reference to the SGW-U information in FIG. 4(a), and makes a request for the SGW-C 40 to change the SGW-U (an arrow B3 in FIG. 9).

Figure 10:
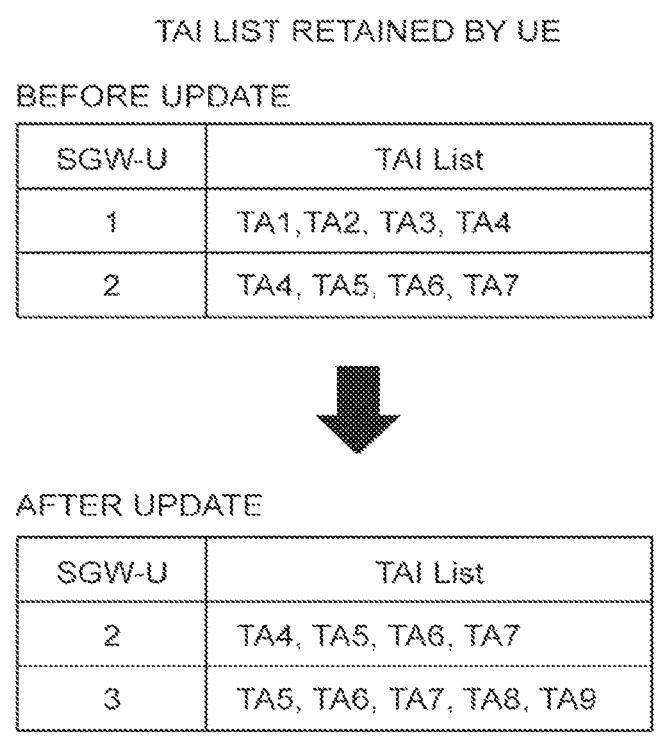
FIG. 10 is a view illustrating an example of a TAI list before update and after update according to the second embodiment.

In addition, the MME 30 creates information (TA5 to TA9) of TAs which constitute the service area of the SGW-U#3 as an additional TAI list, notifies the UE 10 of the TAI list, and updates the TAI list similar to "after update" in FIG. 10 (an arrow B4 in FIG. 9). At this time, the UE 10 recognizes movement to the outside of the service area of the SGW-U#1, and thus the UE 10 deletes information (TAI to TA4) of TAs which constitute the service area of the SGW-U#1.

Furthermore, instead of the aspect in which the MME 30 creates only the additional TAI list and notifies the UE 10 of the TAI list as described above, it is possible to employ an aspect in which the MME 30 creates the entirety of TAI lists after update, and notifies the UE 10 of the TAI lists. That is, the MME 30 may create a plurality of pieces of information (SGW-U#2: TA4 to TA7, and SGW-U#3: TA5 to TA9) of TAs which constitute respective service areas of the SGW-Us (SGW-U#2 and SGW-U#3), in which the UE 10 is resident after movement, as a TAI list after update, and may notify the UE 10 of the TAI list to allow the UE 10 to completely update the retained TAI list into the TAI list after update.

Various Kinds of Processing in Second Embodiment

Hereinafter, description will be given of processing when a PDN connection is added (FIG. 11), TAU processing (FIG. 12), and processing when the PDN connection is cut off (FIG. 13) as processing according to the second embodiment with focus given to a difference from the processing in the first embodiment. Furthermore, attach processing is the same as the processing in FIG. 5 described in the first embodiment, and thus description thereof will be omitted.

(Processing when PDN Connection is Added (FIG. 11))

Figure 6:
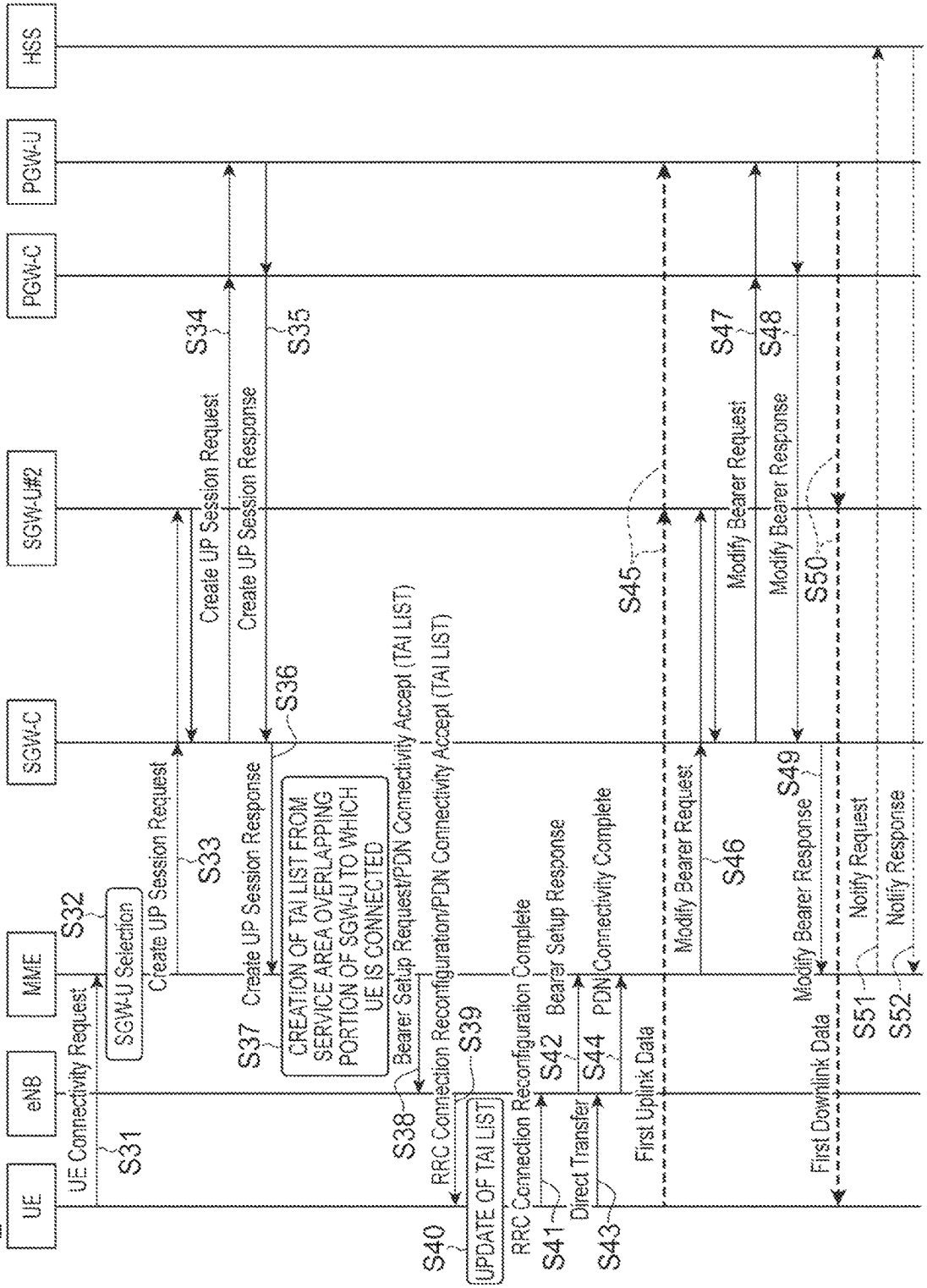
FIG. 6 is a flowchart illustrating a processing example when a PDN connection is added according to the first embodiment.
Figure 11:
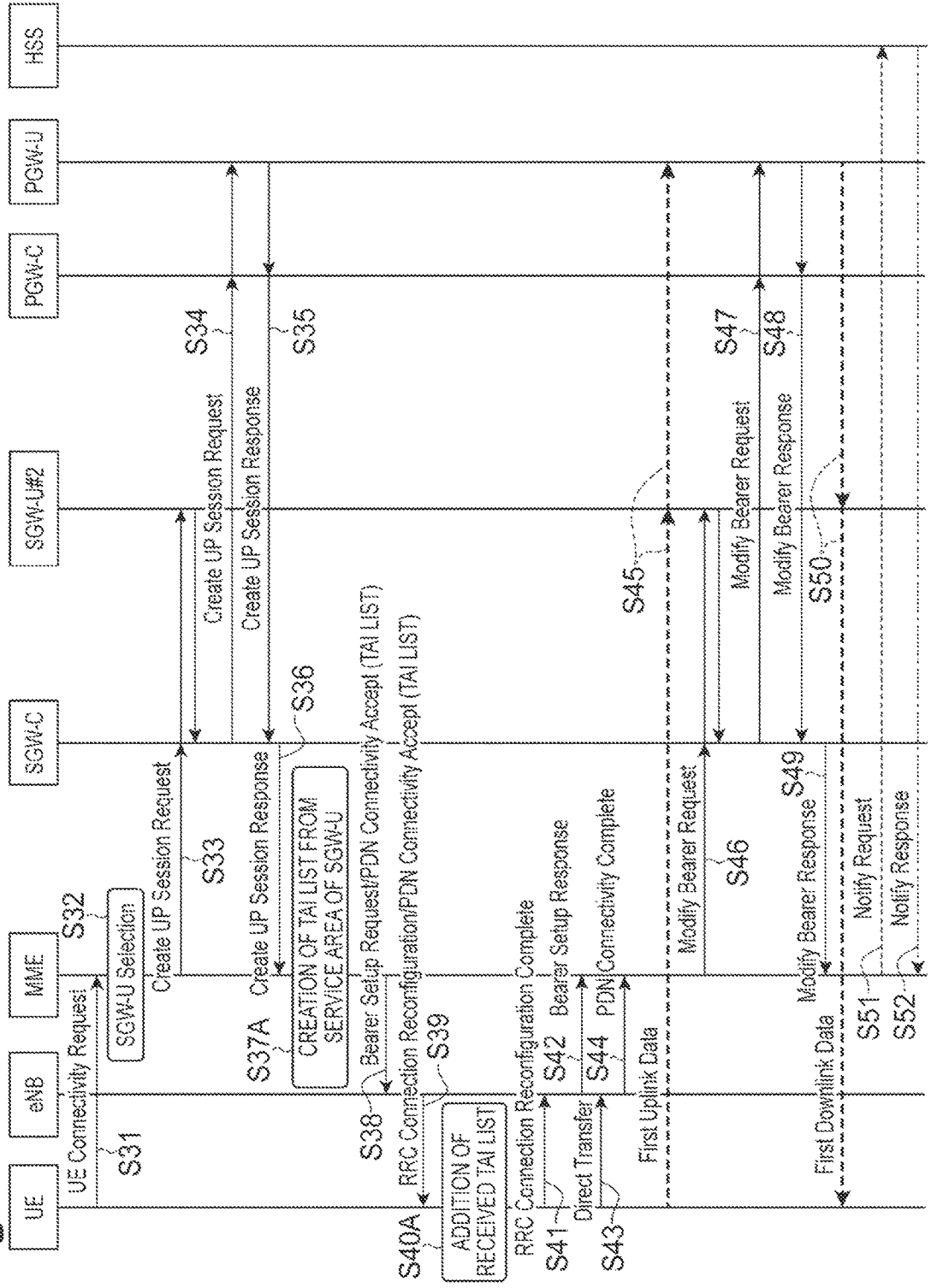
FIG. 11 is a flowchart illustrating a processing example when the PDN connection is added according to the second embodiment.

FIG. 11 illustrates a processing example when the PDN connection is added according to the second embodiment, but the processing example is approximately the same as the processing according to the first embodiment as illustrated in FIG. 6 except for processing in step S37A and processing in step S40A as follows.

In step S37A, the MME creates a TAI list in which TAs (here, "TA4 to TA7") corresponding to a service area of the SGW-U#2 relating to a PDN connection that is added are listed up. Then, when the MME transmits a Bearer Setup Request and PDN Connectivity Accept including the TAI list to the eNB (step S38), the eNB transmits RRC Connection Reconfiguration and the PDN Connectivity Accept including the TAI list to the UE (step S39), and the UE adds the received TAI list to the TAI list that is retained (step S40A).

According to this, the UE retains a TAI list in which TAs respectively corresponding to a service area of an SGW-U relating to an existing PDN connection and a service area of an SGW-U relating to an additional PDN connection are listed up. That is, the UE can perform updating into an appropriate TAI list corresponding to a situation after addition of the PDN connection, and it is possible to appropriately perform the UE location management using the TAI list.

Furthermore, instead of the aspect in which the MME creates only the TAI list that is to be added and notifies the UE of the TAI list as described above, it is possible to employ an aspect in which the MME creates the entirety of TAI lists after addition, and notifies the UE of the TAI lists. That is, the VME may create a plurality of pieces of information (SGW-U#2: TA4 to TA7, and SGW-U#3: TA5 to TA9) of TAs which constitute respective service areas of the plurality of SGW-Us (SGW-U#2 and SGW-U#3) after addition as a TAI list after update, and may notify the UE of the TAI list to allow the UE to completely update the retained TAI list into the TAI list after update.

(TAU Processing (FIG. 12))

Figure 12:
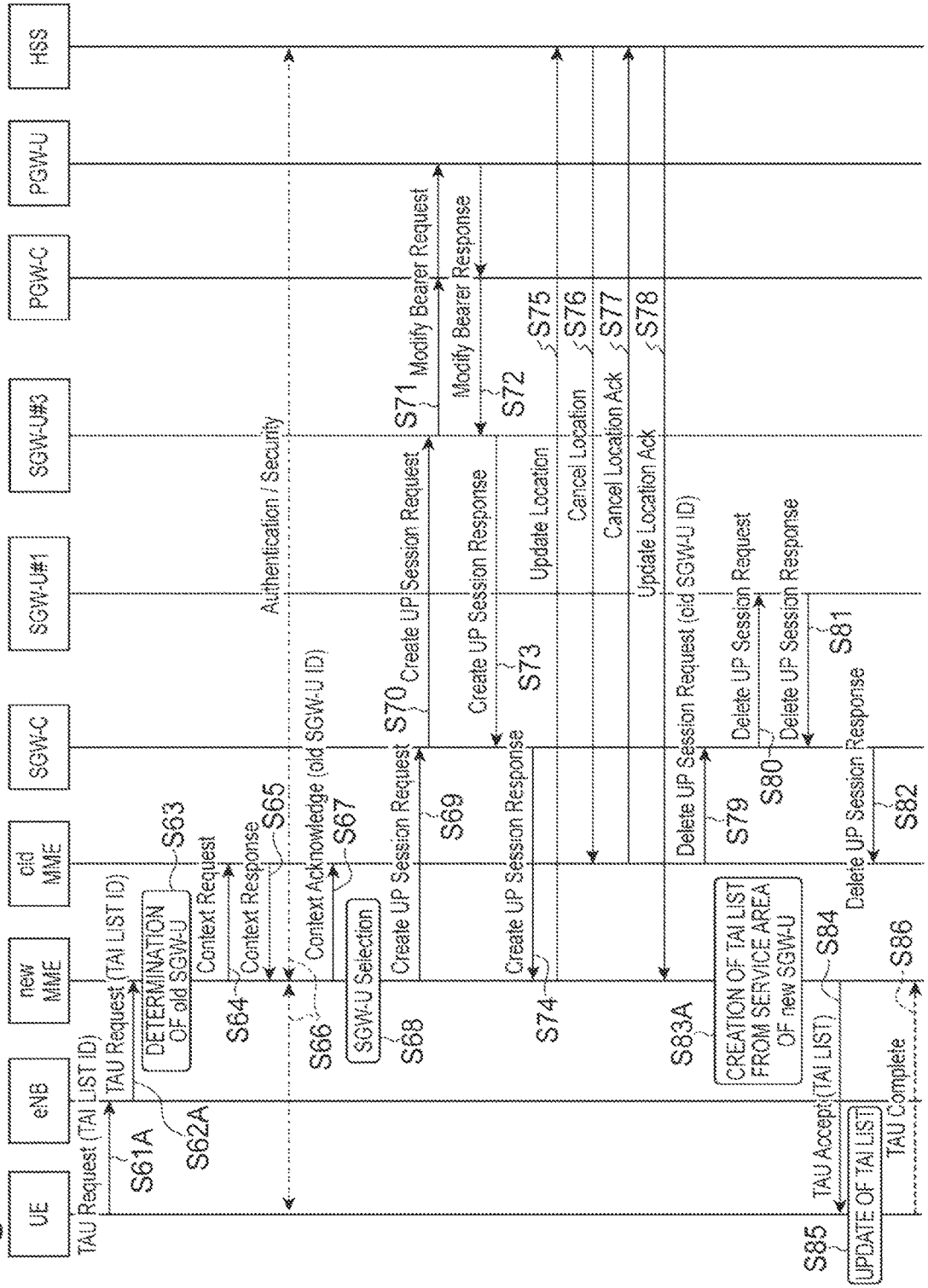
FIG. 12 is a flowchart illustrating an example of TAU processing according to the second embodiment.

FIG. 12 illustrates a TAU processing example according to the second embodiment. However, the TAU processing example is approximately the same as the processing according to the first embodiment as illustrated in FIG. 7 except for processing in step S61A, processing in step S62A, and processing in step S83A as follows.

In step S61A, when moving (for example, from the TA4 to the TA9 as illustrated in FIG. 9), the UE transmits a TAU Request including a TAI list ID relating to the "SGW-U#1", which becomes a service area of which a service is not offered to the UE due to the movement, in the currently retained TAI list to the MME. In step S62A, the eNB detects that the UE after movement is resident in the TA6, and transmits the TAU Request including the TAI list ID to a new MME (described as "new MME" in FIG. 12) that controls the TA6. In addition, in step S63, when receiving the TAU Request, the new MME determines an SGW-U relating to the TAI list ID, that is, an old SGW-U (described as "old SGW-U" in FIG. 12. Here, specifically, the SGW-U#1) that becomes a service area of which a service is not offered to the UE due to movement of the UE with reference to the SGW-U information in FIG. 4(a). Then, the same processing as in the first embodiment is executed.

Then, the new MME selects a new SGW-U (SGW-U#3) which is to take over the service of the old SGW-U (SGW-U#1) in step S68. After receiving an acknowledgement of residence information updating from the HSS in step S78, in step S83A, the new MME additionally creates a TAI list in which TAs (here, "TA5 to TA9") corresponding to service area of the new SGW-U (SGW-U#3) are listed up, and transmits TAU Accept including the TAI list to the UE (step S84).

In addition, the UE adds the TAI list included in the TAU Accept to the TAI list that is retained, and deletes information (TAI to TA4) of TAs which constitute the service area of the "SGW-U#1" from which the UE has moved to the outside of the service area thereof to update the TAI list (step S85).

According to this, the UE retains a TAI list in which TAs corresponding to respective service areas of the SGW-U#2 and the SGW-U#3 relating to the PDN connection after movement are listed up. That is, the UE can perform updating into an appropriate TAI list corresponding to a situation after movement, and it is possible to appropriately perform the UE location management using the TAI list.

Furthermore, instead of the aspect in which the MME creates only the TAI list that is to be added and notifies the UE of the TAI list as described above, it is possible to employ an aspect in which the MME creates the entirety of TAI lists after update, and notifies the UE of the TAI lists. That is, the MME may create a plurality of pieces of information (SGW-U#2: TA4 to TA7, and SGW-U#3: TA5 to TA9) of TAs which constitute respective service areas of the plurality of SGW-Us (SGW-U#2 and SGW-U#3) after movement as a TAI list after update, and may notify the UE of the TAI list to allow the UE to completely update the retained TAI list into the TAI list after update.

(Processing when PDN Connection is Cut Off (FIG. 13))

Figure 8:
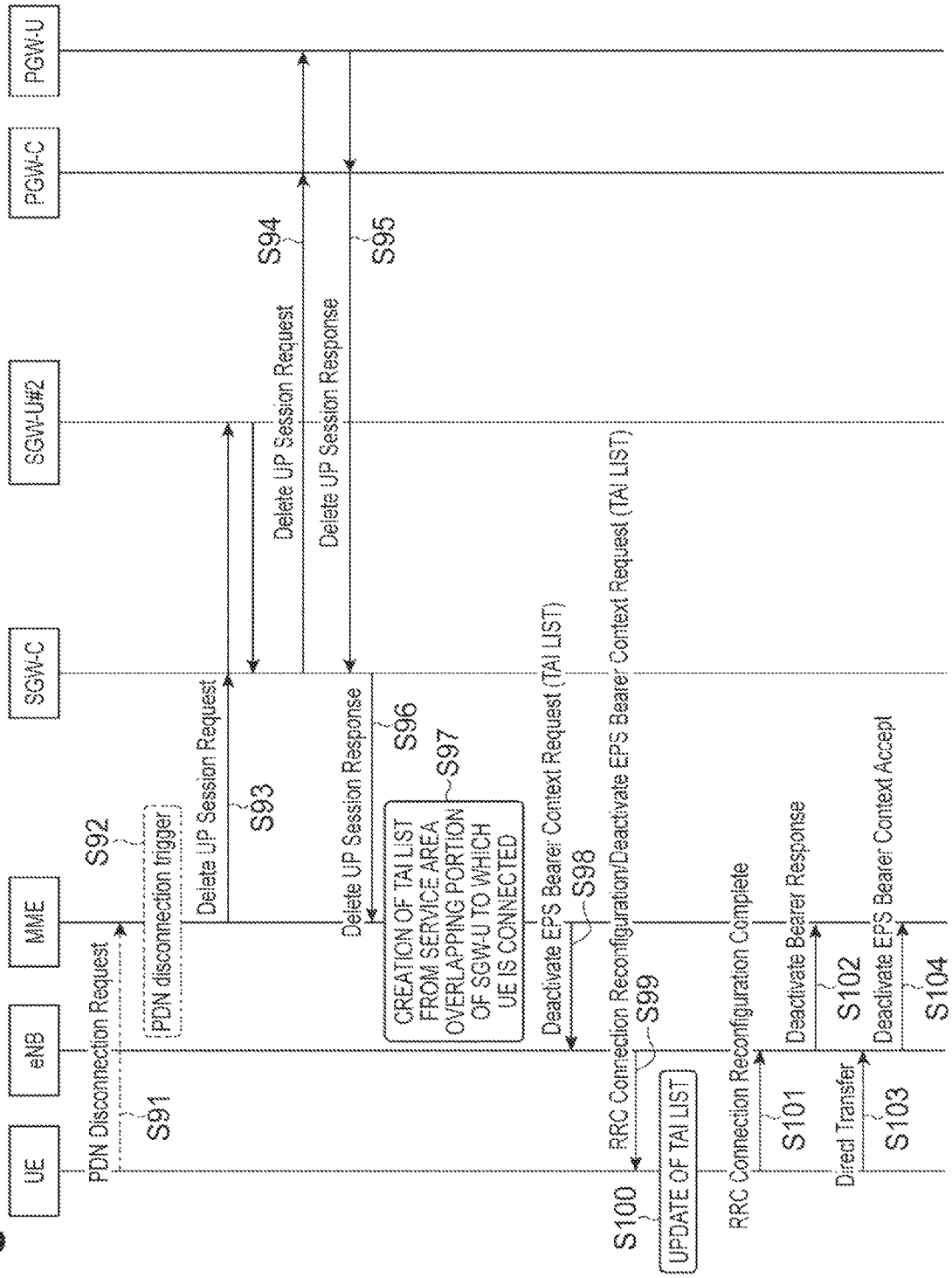
FIG. 8 is a flowchart illustrating a processing example when the PDN connection is cut off according to the first embodiment.
Figure 13:
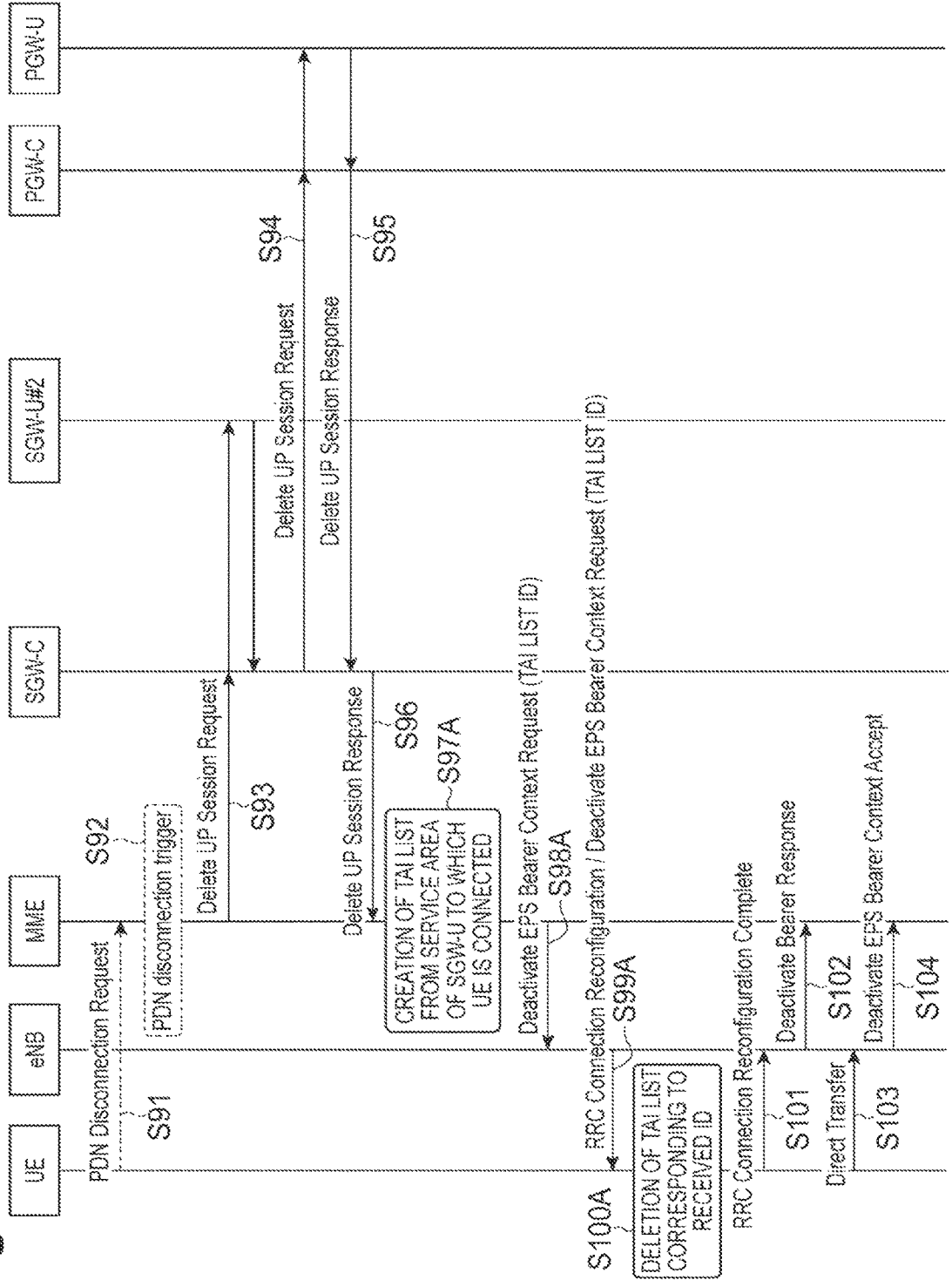
FIG. 13 is a flowchart illustrating a processing example when the PDN connection is cut off according to the second embodiment.

FIG. 13 illustrates a processing example when the PDN connection is cut off according to the second embodiment. However, the processing example is approximately the same as the processing according to the first embodiment as illustrated in FIG. 8 except for processing in step S97A to processing in step S100A as follows.

In step S97A, the MME creates a TAI list in which TAs corresponding to respective service areas of SGW-Us to which the UE is connected after cutting-off of the PDN connection are listed up. At this time, when the UE is connected to only one SGW-U after cutting off the PDN connection, a TAI list in which TAs corresponding to a service area of the one SGW-U are listed up is created. Since the latest TAI list is created in step S97A, the MME recognizes a TAI list ID to be deleted from the TAI list retained by the UE at that point of time along the cutting-off of the PDN connection, and transmits Deactivate EPS Bearer Context Request including the TAI list ID to be deleted to the eNB (step S98A).

When the eNB transmits the Deactivate EPS Bearer Context Request including the TAI list ID to be deleted, and RRC Connection Reconfiguration to the UE (step S99A), in step S100A, the UE deletes a TAI list corresponding to the TAI list ID included in the Deactivate EPS Bearer Context Request from the TAI list that is retained. According to this, the UE can perform updating into an appropriate TAI list corresponding to a situation after cutting-off of the PDN connection, and it is possible to appropriately perform the UE location management using the TAI list.

Furthermore, instead of the aspect in which the TAI list ID to be deleted is notified to the UE from the MME as described above, it is possible to employ an aspect in which the MME creates the entirety of TAI lists after deletion, and notifies the UE of the TAI lists.

According to the above-described second embodiment, when the UE retains information on TAs corresponding to respective service areas of the plurality of SGW-Us as the TAI list, even in any one of the processing when a PDN connection is added (FIG. 11), the TAU processing (FIG. 12), and the processing when the PDN connection is cut off (FIG. 13), the UE can perform updating into an appropriate TAI list corresponding to a situation at that point of time and can retain the TAI list, and it is possible to appropriately perform the UE location management using the TAI list.

Furthermore, when the UE moves from any TA to another TA, an SGW-U, which satisfies conditions in a movement destination, may not exit in some cases. In this case, the MME may create a TAI list from only a service area of an SGW-U to which the UE after movement is already connected, and may notify the terminal of the TAI list for updating of the TAI list. At this time, a bearer in which an SGW-U satisfying the conditions does not exist may be deallocated.

In application of the processing in the first embodiment, the MME sets only SGW-Us to which the UE after movement is connected as a target, and creates a TAI list in which a TA corresponding to an area in which service areas of the SGW-Us in connection overlap each other is listed up. In addition, in application of the processing in the second embodiment, the MME sets only SGW-Us to which the UE after movement is connected as a target, and creates a TAI list in which TAs corresponding to respective service areas of the SGW-Us in connection are listed up.

In addition, when an SGW-U satisfying conditions in a movement destination does not exist, it is possible to employ a method in which a bearer is newly constructed in an SGW-U that exists in the movement destination (that is, the SGW-U that does not satisfy the conditions).

Furthermore, the "information" described in this specification may be expressed by using any one of other various technologies. For example, data, an instruction, a command, information, a signal, a bit, a symbol, a chip, and the like, which are stated over the entirety of the above description, may be expressed by a voltage, a current, an electromagnetic wave, a magnetic field or a magnetic particle, a photo field or a photon, or an arbitrary combination thereof.

Description of "on the basis of" in this specification does not represent "only on the basis of" unless otherwise stated. In other words, description of "on the basis of" represents both "only on the basis of" and "at least on the basis of."

In a procedure, a sequence, a flowchart, and the like in the aspect and the embodiment which are described in this specification, the order thereof may be changed as long as inconsistency does not occur. For example, with regard to the method that is described in this specification, elements of various steps are suggested in an exemplary order, and there is no limitation to the specific order that is suggested.

The aspects and the embodiment described in this specification may be used along or in combination thereof, or may be switched and used in accordance with execution. In addition, notification of predetermined information (for example, notification of "a fact of X") is not limited to the explicit notification, and may be performed in an implicit manner (for example, notification of the predetermined information is not performed).

Hereinbefore, the invention has been described in detail, but it is apparent by those skilled in the art that the invention is not limited to the above-described embodiment in this specification. The invention can execute a variation aspect and a modification aspect without departing from the gist or the scope of the invention which is determined by description of the appended claims. Accordingly, description in this specification is made for exemplary explanation, and does not have any limiting meaning with respect to the invention.

The term "determining" that is used in this specification includes various operations. For example, "determining" may include calculating, computing, processing, deriving, investigating, looking up (for example, looking up in a table, a database, or other data structures), ascertaining, and the like. In addition, "determining" may include receiving (for example, information receiving), accessing (for example, accessing to data in a memory), and the like. In addition, "determining" may include resolving, selecting, choosing, establishing, comparing, and the like.

Furthermore, terms described in this specification and/or terms necessary for understanding of this specification may be substituted with terms having the same or similar meaning.

Terms "system" and "network" used in this specification are compatibly used.

Information, parameters, and the like which are described in this specification may be expressed by an absolute value, a relative value from a predetermined value, or corresponding another information. For example, a radio resource may be indicated by an index.

When "include", "including", and a modification thereof are used in this specification and the appended claims, these terms are intended as comprehensive terms similar to "comprise." In addition, a term ("or") that is used in this specification and the appended claims is not intended as an exclusive logical sum.

The aspect and the embodiment which are described in this specification may be applied to long term evolution (LTE), LTE-Advanced (LTE-A), SUPER 3G; IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), other systems which use a suitable system, and/or a next generation system that is extended on the basis of the systems.

Information that is input or output, and the like may be stored in a specific location (for example, a memory), or may be managed by a management table. The information that is input or output, and the like may be subjected to rewriting, updating, or additional writing. The information that is output, and the like may be deleted. The information that is input, and the like may be deleted. The information that is input, and the like may be transmitted to other devices.

In the entirety of the present disclosure, as long as there is no obvious statement about a singular form, it should be understood that both a singular form and a plural form are included.

REFERENCE SIGNS LIST

1: Communication system; 10: UE (terminal); 20: eNodeB; 30: MME; 40: SGW-C; 50: SGW-U; 60: PGW-C; 70: PGW-U; 80: HSS; 100: Device; 101: CPU; 102: RAM; 103: ROM; 104: Communication module; 105: Auxiliary storage device.

The invention claimed is:

1. A tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to a plurality of user planes, wherein, the terminal retains, as a tracking area identity list, information on tracking area corresponding to overlapping portion of service area overlapping among service areas of the plurality of user planes, and the tracking area identity list updating method comprises:

a step of, in response to the terminal's moving from one tracking area described in the tracking area identity list to another tracking area outside of the one tracking area, transmitting information on the another tracking area and an update request of the tracking area identity list to the processing server, by the terminal, and a step of creating a new tracking area identity list corresponding to an overlapping portion of service area of user planes, overlapping among service areas of the user planes in which the another tracking area is considered as a service area, and notifying the terminal of the new tracking area identity list for updating the current tracking area identity list, by the processing server, in response to the update request.

2. A tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to a plurality of user planes, the tracking area identity list updating method comprising:

a step of, in response to the terminal's being connected to another new user plane or in response to the terminal's cutting off a connection with one of the user planes to which the terminal is connected, transmitting an update request of the tracking area identity list to the processing server, by the terminal; and a step of creating a new tracking area identity list corresponding to a new overlapping portion of service areas of user planes, overlapping among service areas of the user planes after updating in response to the update request, and notifying the terminal of the new tracking area identity list for updating the current tracking area identity list, by the processing server.

3. A tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to a plurality of user planes, wherein the terminal retains, as a tracking area identity list for every user plane, information on tracking areas which constitute a service area of each of the plurality of user planes, and the tracking area identity list updating method comprises:

a step of, in response to the terminal's moving from one tracking area described in the tracking area identity list to another tracking area outside of the one tracking area, transmitting information on the another tracking area and an update request of the tracking area identity list to the processing server, by the terminal; and a step of creating information relating to the tracking area identity list corresponding to the plurality of user planes in which the another tracking area is considered as a service area, and notifying the terminal of the created information to update the tracking area identity list for every user plane, by the processing server, in response to the update request.

4. The tracking area identity list updating method according to claim 3, wherein, in the step of creating, the processing server creates, as the information relating to the tracking area identity list, information on tracking areas which constitute a service area of a user plane added along with movement among the plurality of user planes.

5. The tracking area identity list updating method according to claim 3,
wherein, in the step of creating, the processing server creates, as the information relating to the tracking area identity list, information on tracking areas which constitute a service area of each of the plurality of user planes.

6. A tracking area identity list updating method for updating a tracking area identity list in a communication system which includes: a terminal; a processing server that executes processing relating to the terminal; and a plurality of serving gateways, wherein the plurality of serving gateways are classified into a control plane that is a route through which a control signal for a communication service used by the terminal is transmitted, and a user plane that is a route through which a user signal for the communication service is transmitted, and the terminal is connected to a plurality of user planes, the tracking area identity list updating method comprising:
a step of, in response to the terminal's being connected to another new user plane or in response to the terminal's cutting off a connection with one of the user planes to which the terminal is connected,
transmitting an update request of the tracking area identity list to the processing server, by the terminal; and
a step of creating information relating to a tracking area identity list corresponding to the plurality of user planes after updating in response to the update request, and notifying the terminal of the created information to update the tracking area identity list for every user plane, by the processing server.

7. The tracking area identity list updating method according to claim 6,
wherein, in the step of creating, the processing server creates, as information relating to the tracking area identity list, information on tracking areas which constitute a service area of an added new user plane.

8. The tracking area identity list updating method according to claim 6,
wherein, in the step of creating, the processing server creates, as information relating to the tracking area identity list, information on tracking areas which constitute a service area of each of the plurality of user planes after update.

* * * * *

UNITED STATES PATENT AND TRADEMARK OFFICE
CERTIFICATE OF CORRECTION

PATENT NO. : 10,390,181 B2
APPLICATION NO. : 16/061386
DATED : August 20, 2019
INVENTOR(S) : Masayoshi Shimizu et al.

Page 1 of 1

It is certified that error appears in the above-identified patent and that said Letters Patent is hereby corrected as shown below:

On the Title Page

Item (71), the Applicant name is incorrect. Item (71) should read:
-- (71) Applicant: NTT DOCOMO, INC., Chiyoda-ku (JP) --

Signed and Sealed this
Fifteenth Day of October, 2019

Andrei Iancu
*Director of the United States Patent and Trademark Office*